Douglas W. Dron
INVENTOR.

BY *Lee R. Larkin*

ATTORNEY

April 23, 1968 D. W. DRON 3,379,307
LUMBER SORTING APPARATUS
Filed Oct. 19, 1966 4 Sheets-Sheet 3

Douglas W. Dron
INVENTOR.

BY

ATTORNEY

Douglas W. Dron
INVENTOR.

BY Lee R. Larkin

ATTORNEY

United States Patent Office 3,379,307
Patented Apr. 23, 1968

3,379,307
LUMBER SORTING APPARATUS
Douglas W. Dron, Phoenix, Ariz., assignor to Southwest Forest Industries, Inc., Phoenix, Ariz., a corporation of Nevada
Filed Oct. 19, 1966, Ser. No. 587,784
10 Claims. (Cl. 209—123)

This invention relates to a lumber sorting apparatus. More particularly, this invention relates to an apparatus which is particularly designed for sorting lumber and placing it in a storage position whereby the lumber is supported in a standing position, i.e., in a generally vertical position supported on one edge thereof.

During the production of lumber wherein boards are cut from logs it is necessary that the lumber be sorted as to grade and length and thereafter stored, dried and otherwise processed. This handling ordinarily requires a considerable amount of hand labor unless the operation is substantially mechanized. During the mechanization of this handling it has been common practice to sort the lumber as to length and grade and thereafter store the lumber in accumulation trays in a flat position. However, when the boards are stored in a flat position a reduced number can be supported on the tray, as opposed to the situation where the boards are turned vertically, i.e., in a generally standing position and being supported on the lower edge thereof.

It is therefore an object of the present invention to provide an improved lumber sorting and accumulation apparatus which is particularly adapted for diverting the lumber to the proper storage tray and there supporting it in the aforesaid standing position.

Briefly stated, the apparatus of the present invention includes an inclined chute means adapted for movement of pieces of lumber downwardly thereon generally in single file, with the long axes thereof generally horizontal. Lumber accumulating tray means are spaced apart from the chute means. In addition there is provided first deflector means which are associated with the chute means and are adapted to selectively deflect pieces of lumber from the chute means associated with the tray means which are adapted to engage the leading edge of the deflected pieces of lumber and to further deflect these pieces of lumber to a generally vertical standing position in the tray means. Support means for supporting at least a portion of the pieces in the standing position in the tray means during accumulation of the pieces therein are also provided.

In certain embodiments means are also provided for advancing the pieces of lumber which have been accumulated in the tray means in preparation for receipt of a succeeding piece of deflected lumber. There may also be provided lift means which are cooperative with the second deflector means for lifting the trailing edges of the pieces of lumber to the standing position in the tray means.

Reference to the drawings will further explain the invention wherein like numerals refer to like parts and in which.

Figure 1:
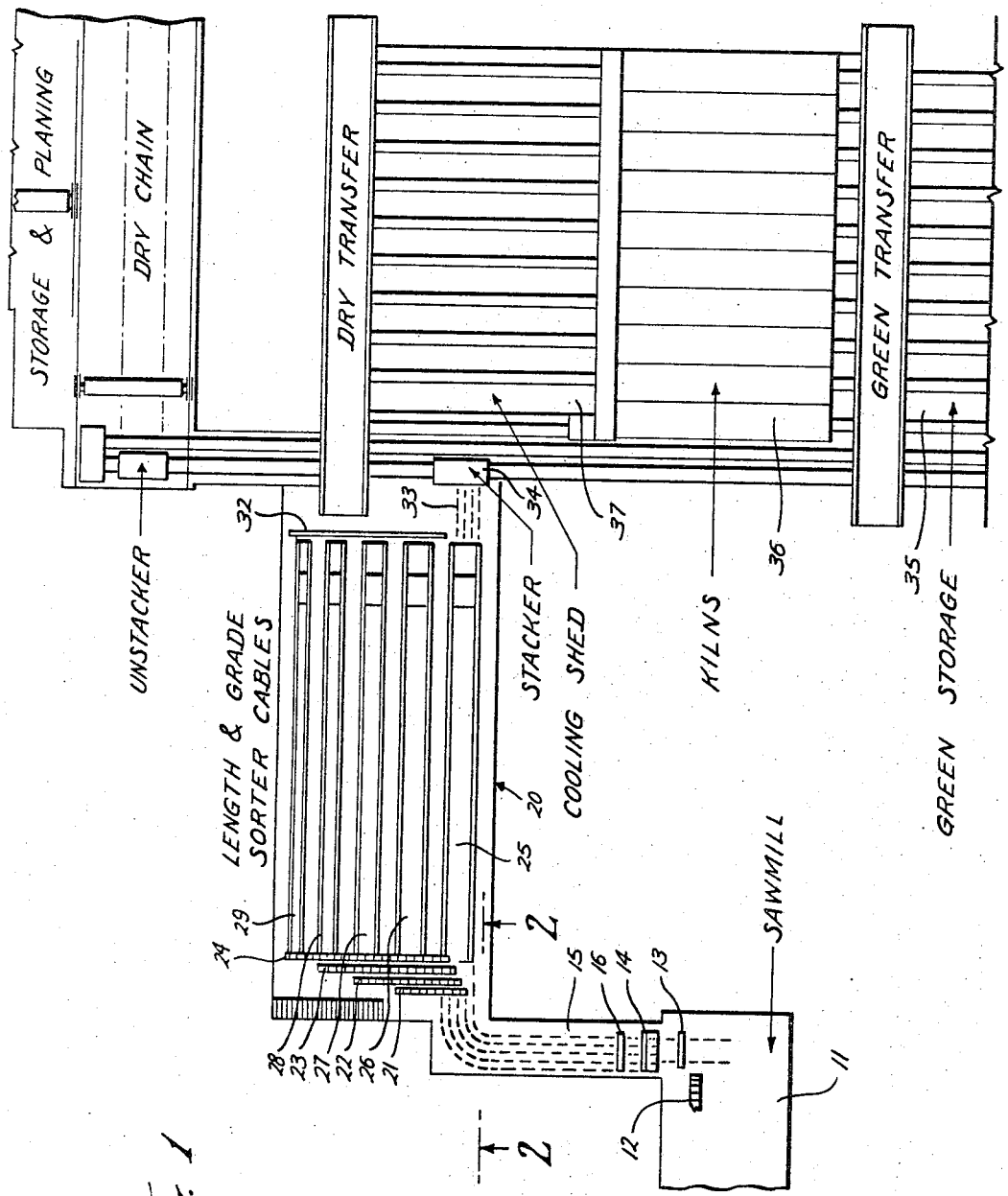
FIG. 1 is a plan view of the general layout of a lumber mill.

Referring now to FIG. 1, during the milling of lumber, logs are cut into boards in sawmill 11 and advanced by roll case 12 where they are deposited on a transversely moving conveyor, whereby the boards are passed through board turner 13 where the operator may observe both sides of the board in determining its grade, from whence the boards go to trim saw 14 and thence to conveyor 15 for movement to the balance of the sorting and storage operation. In certain instances some of the boards will be removed from conveyor 15 at drop outs 16, as for example, if a board does not meet certain quality standards.

The boards are carried to length and grade sorter 20, which includes transverse roll cases 21, 22, 23, and 24 and storage racks 25, 26, 27, 28, and 29.

The right hand end of length and grade sorter 20, as viewed in FIG. 1, is also provided with transverse roll case 32 which is adapted to discharge accumulated lumber onto stacker table 33 where it is subsequently transferred to stacker 34 for movement to green storage 35, kiln 36, cooling shed 37 and other sections of the lumber mill.

Figure 2:
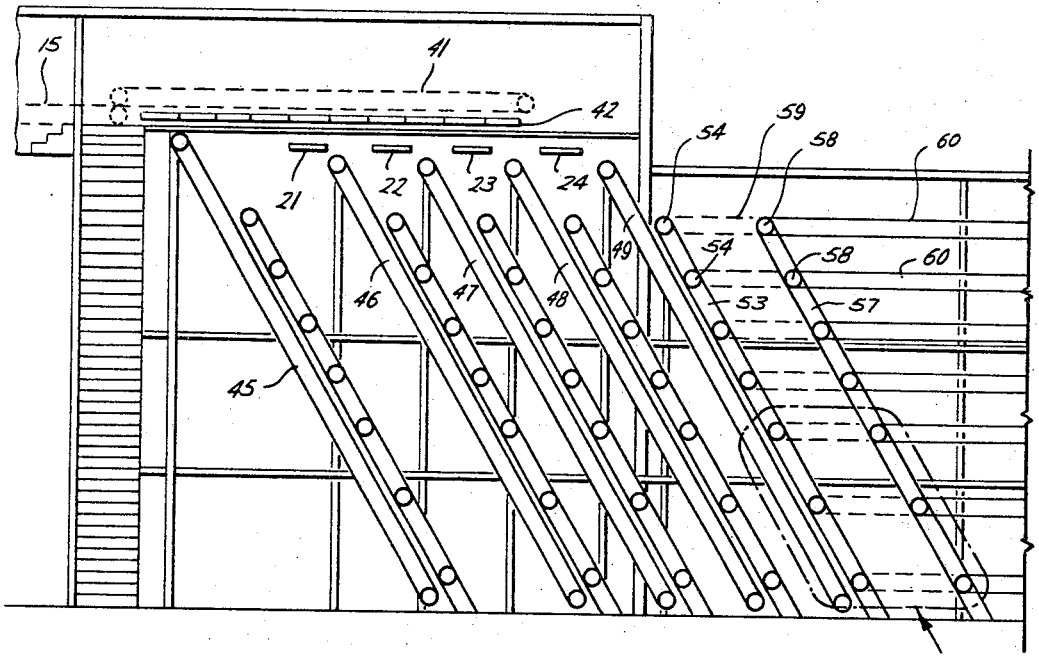
FIG. 2 is a side elevation view, partially broken away, generally taken at line 2—2 of FIG. 1 showing the lumber chutes and associated elements.

As stated above, FIG. 2 is a side elevation view taken generally at line 2—2 of FIG. 1 and shows the feed end of the various tray means which are described hereinafter. Transfer conveyor 15 delivers the boards to the underside of transfer chain 41 which pulls the board across length drop out support 42 which is arranged so that various lengths of pieces of lumber are dropped therefrom to the desired chute or roll case disposed therebelow for movement to the appropriate storage tray. Hence, long boards, as for example 16 foot lengths, are dropped onto chute means in the form of a pair of spaced-apart inclined chute beams 45 which may be inclined at an angle of 30° from the perpendicular, for example.

Drop out support 42 is also arranged to deposit shorter length boards, 14 foot lengths, for example, on roll case 21, 12 foot boards on roll case 22, 10 foot length boards on roll case 23, and 8 foot lengths or shorter on roll case 24. Roll cases 21, 22, 23, and 24 transfer the boards laterally until the limit switch (not shown) is struck at the end of the roll case.

Each of the roll cases 21, 22, 23, and 24 is provided with appropriate flipper means (not shown) which are actuated by the aforesaid limit switches so that roll case 21 deposits boards onto a pair of spaced-apart inclined chute beams 46; roll case 22 deposits on chute beams 47; roll case 23 deposits on chute beams 48; and roll case 24 deposits on chute beams 49. Further, chute beams 45 are associated with storage rack 25 shown in FIG. 1; beams 46 are associated with rack 26; beams 47 are associated with rack 27; beams 48 are associated with rack 28 and beams 49 are associated with rack 29.

Each of the chute beams 45, 46, 47, 48, 49 is provided with pulleys on the upper and lower ends thereof which are adapted for supporting and moving, chain means having associated lugs for carrying the lumber downwardly thereon in a generally horizontal position as will be explained hereinafter. In addition, each of the beams 45, 46, 47, 48, 49 is associated with a plurality of stacked tray means which tray means are shown only with respect to chute 49 in FIG. 2, although it is to be understood that similar tray means are associated with the other chute beams. The tray means associated with chute beams 49 include a pair of end tray beams 53 which are spaced apart from beams 49 a distance which is sufficient for the passage of lumber therebetween, and support a plurality of pulleys 54 thereon. In addition there is provided a pair of intermediate tray beams 57 which are generally parallel with beams 53 and likewise have a plurality of pulleys 58 mounted thereon.

A plurality of endless chains 59 are supported about each pulley 54 and pulley 58. In addition, each of the beams 57 supports a plurality of pulleys (not shown) which may be mounted on the same shafts as pulleys 58 but free moving with respect thereto, thereby supporting a plurality of endless cables 60 which are adapted to receive stacked lumber from chains 59 when the latter are actuated. It is to be understood that chains 59 and cables 60 are powered by appropriate power means (not shown), acting on one of the associated pulleys.

Figure 3:
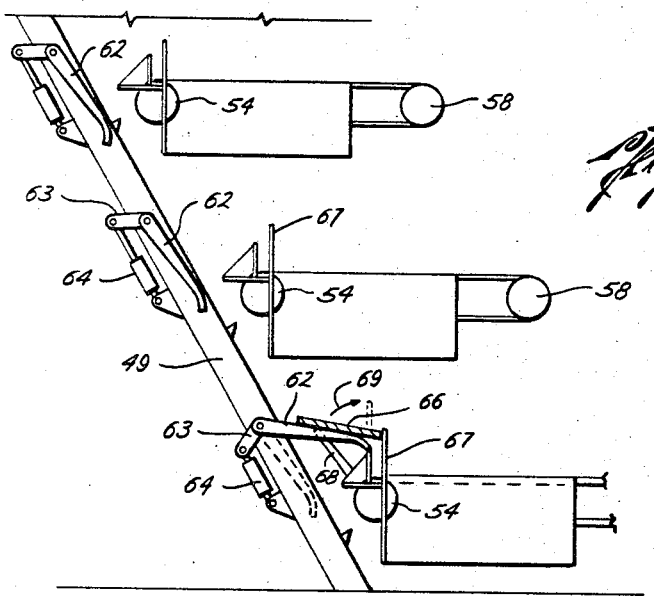
FIG. 3 is an enlarged view of that portion indicated by the numeral 3 in FIG. 2.

Each of the chute beams 46, 47, 48, and 49 has associated therewith a plurality of first deflector means best shown in FIG. 3. There a section of one of the beams 49 is shown with three deflector arms 62, the lowermost of which is shown in the deflecting position. Each of the selector arms 62 is mounted securely on an appropriate shaft and has a corresponding actuator arm 63 associated therewith and rigidly secured thereto and having the rearward end thereof connected to be operated by a two-way air cylinder 64. At the appropriate time selector arm 62 is actuated to the deflecting position by operation of cylinder 64 by an operator from an appropriate control position. For example, an operator located near board turner 13 could identify the grade of a particular board and identify it through a memory system such that air cylinder 64 would be actuated at the appropriate time to deflect board 66, for example, in the manner shown in FIG. 3.

The Republic Electric & Development Co. of Seattle, Wash., offers for sale a "memory system" of the type which is suitable for incorporation with the apparatus of this invention, such that selector arms 62 are appropriately actuated to the deflecting position in coordination with the quality of any particular board being deflected and boards of common grade can be stored in a single tray means which is to be further described hereinafter.

Second deffector means in the form of stop plate 67 are associated with each of the first deflector means and cooperate therewith to turn the board to a generally vertical position standing on the lower edge thereof.

In addition, the deflector means have associated therewith a lifting means in the form of lift arm 68 which is adapted to engage the lower side of board 66 near its rearward or trailing edge and to exert a generally upward force in the direction of arrow 69, thereby helping to facilitate rotation or tilting of board 66 to the vertical or standing position.

Figure 4:
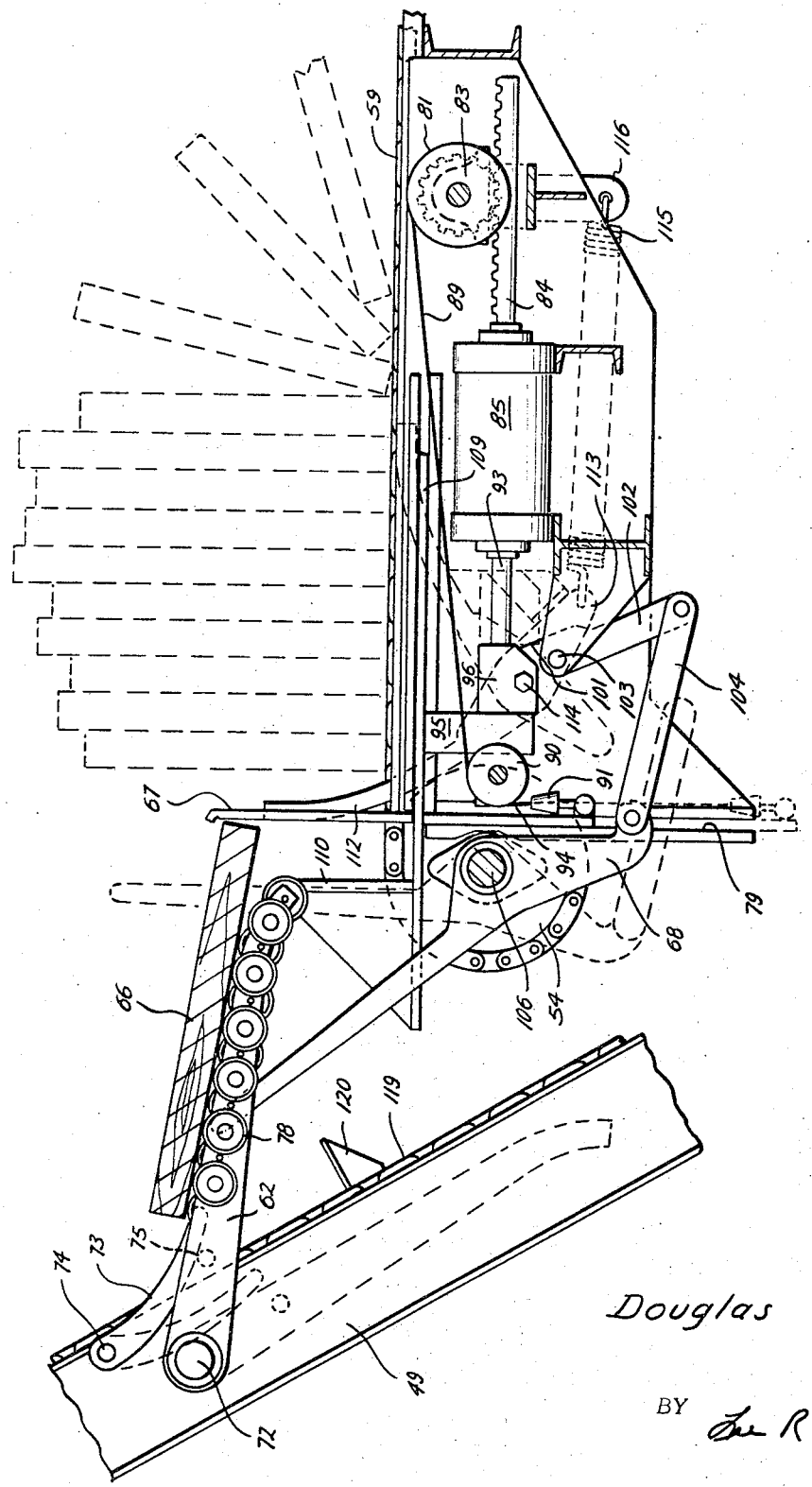
FIG. 4 is a further enlarged side elevation view, partially in section, of one of the selector arms and accumulation trays shown in FIG. 3.
Figure 5:
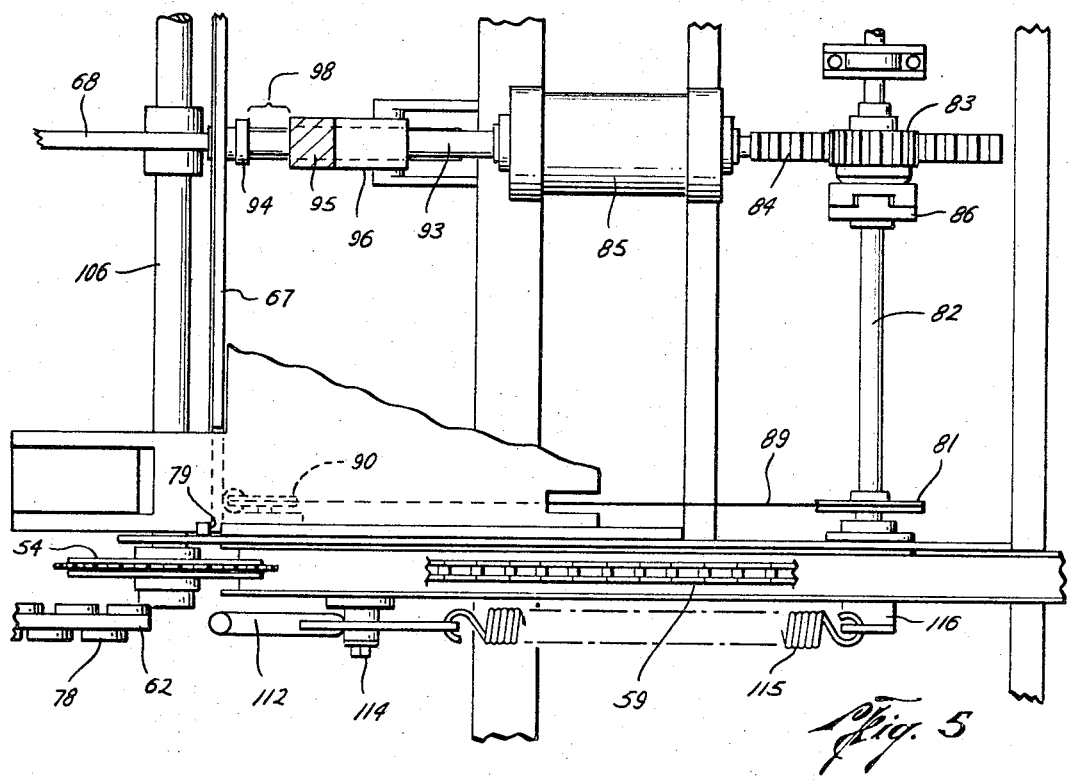
FIG. 5 is a top plan view of the apparatus generally shown in FIG. 4.
Figure 6:
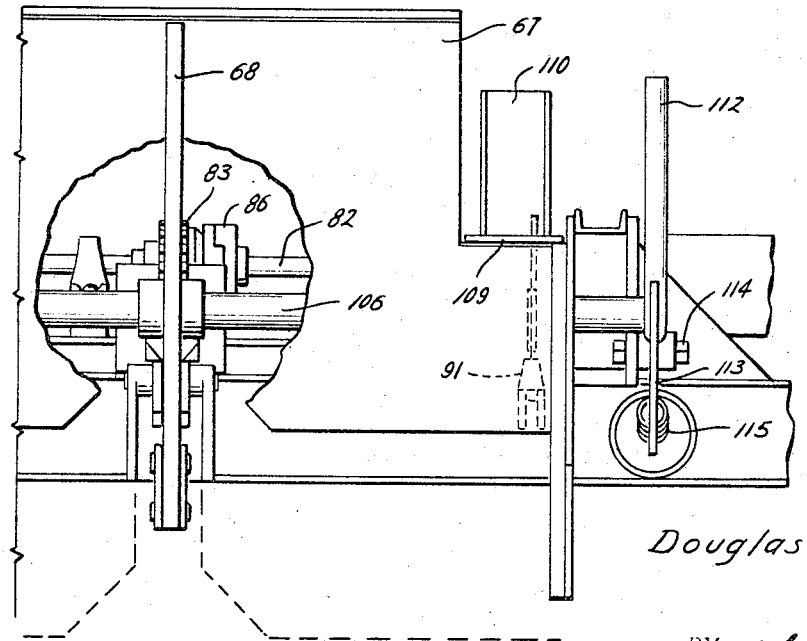
FIG. 6 is an end elevation view, partially broken away of the apparatus shown in FIG. 4 as viewed from the left hand end.

Reference to FIGS. 4, 5 and 6 will further explain the operation of one first and second deflector means and the lifting means.

Selector arm 62 is mounted on shaft 72 passing through beams 49 as aforesaid and is rotated to the deflector position shown in FIG. 4 by operation of air cylinder 64 as explained in connection with FIG. 3. In the non-deflecting position or non-actuated position, selector arm 62 is lowered to the dotted position shown therebelow. Each of the selector arms 62 may also have associated therewith a deflector finger 73 mounted on an appropriate pin 74 passing through beam 49 and which may be cammed to the deflector position shown in FIG. 4 by an appropriate lug 75 mounted on the side of selector arm 62 which is for the purpose of providing a smooth upper contacting surface for contacting board 66 during the deflection as described above. Each of the selector arms 62 has mounted thereon a plurality of rollers 78 to facilitate passage of board 66 thereover during the deflection.

As best seen in FIGS. 4, 5 and 6, stop plate 67 may be of a heavy plate of metal having the upper edge turned in the direction of board 66 as shown in FIG. 4. The ends of stop plate 67 are adapted for vertical movement in channels 79 which are formed by the frame construction and in which channels the stop plate 67 is adapted for retractable movement up and down. Plate 67 is moved to and from the retracted position by operation of pulley 81 which is mounted on axle 82 which is adapted to be driven at an appropriate time by pinion gear 83 and rack 84 connected to air cylinder 85 through electric clutch 86 mounted on axle 82, as best seen in FIG. 5 Pulley 81 has running thereover steel cable 89 which also passes over pulley 90 and connects by connector 91 to the lower edge of plate 67.

Air cylinder 85 has mounted therein a piston which operates piston rod 93 which is connected at one end to rack 84 and which is provided with an enlarged lug 94 at the opposite end thereof, which lug is adapted to engage pusher lug 95 after approximately 2½" of free travel 98. Piston rod 93 also has attached thereto cam block 96 for camming movement to the right as viewed in FIGS. 4 and 5.

Cam block 96 is provided with a beveled forward edge which is adapted to engage ear 101 of cam lever 102 mounted on pivot pin 103. The lower end of lever 102 is pivotally connected to linkage 104 which is similarly pivotally connected to the lower end of lift arm 68 mounted on shaft 106. Hence, during camming movement of cam block 96 to the right as viewed in FIGS. 4 and 5, ear 101 is rotated downwardly thereby causing lift arm 68 to be rotated upwardly, in the direction of arrow 69 as shown in FIG. 3, to thereby engage the lower surface and trailing edge of board 66 to provide a lifting force thereto so as to turn board 66 in a generally vertical or standing position.

Means are also provided for advancing the accumulated boards in the tray means once they are turned to the standing position which means includes pusher plate 109 which is connected, as by welding, to pusher lug 95 and has connected to the upper side thereof pusher 110 which is adapted for or shaped to form a channel between it and the forward edge of stop plate 67, in which channel board 66 is deflected so as to stand on its lower end and in a generally vertical position.

Pusher plate 109 and pusher 110 are adapted for movement to the right as viewed in FIGS. 4 and 5 at predetermined intervals and in synchronism with and in cooperation with the operation of stop plate 67 by means of air cylinder 85 operating piston rod 93 acting on pusher lug 95 after the aforesaid free travel 98.

Resilient biasing means are also provided for exerting a pushing force on the forward surface of board 66 when held in a standing position to maintain the board in the upright position. Such biasing means includes spring arm 112 mounted on and connected to an oscillating lever 113 which is pivoted on pivot pin 114. The lower end of lever 113 is connected with one end of tension spring 115, the opposite end of which is connected to lug 116 which is connected to a portion of the frame. During the accumulation of boards in the accumulation tray and on top of chain 59, spring arm 112 is gradually depressed to the dotted position shown. It is to be understood that the first few boards which are accumulated in the tray may topple over from the perfectly vertical position, nevertheless the majority of the boards is held in the generally vertical standing position.

Referring now to FIGS. 4, 5 and 6, and in particular, FIG. 4, board 66 will be carried down the upper surface of beams 49 by endless chain 119 having stop lugs 120 thereon which are adapted to support boards thereabove. As the pair of stop lugs 120 supporting board 66 pass below selector arm 62, board 66 is intercepted and deflected by selector arm 62 and finger 73 and diverted to the position shown in FIG. 4. It is to be understood that narrow boards will automatically fall to the vertical standing position whereas wider boards may need an assist by lift arm 68 as will be explained hereinafter.

When board 66 strikes the forward edge of stop plate 67, a pressure sensitive switch (not shown) is actuated to thereby actuate air cylinder 85 such that piston rod 93 is driven to the right as viewed in FIGS. 4 and 5. After the 2½" of free travel 98, piston lug 94 will engage the back end of pusher lug 95. During the movement of piston 93 through free travel 98, cam block 96 is moved to the right as viewed in FIGS. 4 and 5 thereby causing lift arm 68 to be moved or rotated upwardly to thereby exert a lifting force to the bottom surface of board 66 as explained above. In addition, during the movement of piston rod 93 through the aforesaid free travel 98, rack 84 will similarly be moved thereby causing pulley 81 to be rotated in a counter clockwise direction as viewed in FIG. 4, to thereby cause stop plate 67 to lower, so that the projection on the upper edge thereof engages the leading edge of board 66, thereby helping lifting arm 68 to stand board 66 in the vertical or standing position.

After the travel of piston rod 93 through the 2½″ of free travel 98, piston lug 94 engages the back surface of pusher lug 95 which thereby causes pusher 110 to be moved to the right as viewed in FIGS. 4 and 5, at which point electric clutch 86 is deenergized (by switch means not shown) which thereby allows stop plate 67 to drop rapidly by gravity so that the upper edge thereof is supported below the lower surface of pusher plate 109, which thereby permits pusher 110 to move board 66 forward.

When pusher 110 is moved forward to its fullest extent limit switch means causes air cylinder 85 to operate in a reversed stroke, at which point electrical clutch 86 is energized, which acts with rack 84 and pinion gear 83 to turn pulley 81 whereby cable 89 is wound thereon, thereby lifting stop plate 67 to its original starting position. At the same time pusher 110 is retracted, together with lift arm 68 to receive another board.

Spring arm 112 is simply a spring loaded member which will tend to keep the first two or three boards upright. Spring arm 112 is gradually moved backward to below the top of chain 59 by the weight of the boards. When chain section 59 is full, a limit switch (not shown) is actuated whereby the boards are automatically moved onto the associated storage cables 60 by powered movement of chain 59, at which point spring arm 112 will return to support the first boards of a new batch, when the boards moving onto the associated cables 60 have passed the end of spring arm 112.

When it is desired to unload the boards from cables 60 this may be done in conventional manner via roll case 32 as explained above. The apparatus is automatically operated.

Hence, the invention provides an apparatus and method for accumulating and storing boards in a standing or vertical position which reduces the surface space needed to support a given quantity of lumber.

Modifications may be made in the invention as particularly described without departing from the scope of the invention. Accordingly, the foregoing description is to be construed as illustrative only and is not to be construed as a limitation upon the invention as defined in the following claims.

What is claimed is:

1. An apparatus for sorting pieces of lumber, comprising:
   inclined chute means adapted for movement of pieces of lumber downwardly thereon with the long axes thereof generally horizontal;
   lumber accumulating tray means spaced apart from said chute means;
   first deflector means associated with said chute means and adapted to selectively deflect pieces of lumber from said chute means to said tray means;
   second deflector means associated with said tray means and adapted to engage the leading edge of said deflected pieces of lumber and to further deflect said pieces of lumber to a generally vertical standing position in said tray means; and
   support means for supporting at least a portion of said pieces in said standing position in said tray means during accumulation of said pieces therein.

2. The apparatus as claimed in claim 1 including:
advancing means for advancing said pieces of lumber in said tray means in preparation for receipt of a succeeding piece of deflected lumber.

3. The apparatus as claimed in claim 1 including:
lift means cooperative with said second deflector means for lifting trailing edges of said pieces of lumber to said standing position in said tray means.

4. The apparatus as claimed in claim 1 wherein:
said second deflector means includes a retractable member having means for engaging the leading edges of said pieces of deflected lumber and deflecting said leading edges downwardly.

5. The apparatus as claimed in claim 2 wherein:
said advancing means includes a pusher member adapted to push said pieces of lumber forward in said tray means while said pieces are supported in said standing position.

6. The apparatus as claimed in claim 4 wherein:
said advancing means includes a pusher member adapted to push said pieces of lumber forward in said tray means while said pieces are supported in said standing position, said pusher member being synchronized with said retractable member, whereby said pusher member is energized only after said retractable member is moved to the retracted position.

7. The apparatus as claimed in claim 1 wherein:
said support means includes resilient biasing means adapted to engage the forward side of a piece of lumber accumulated in said tray means during a predetermined amount of subsequent accumulation of pieces of lumber therein.

8. The apparatus as claimed in claim 3 wherein:
said lift means includes a lifting arm which is adapted to engage the lower surface of said pieces of lumber and to exert a generally upward force therein.

9. The apparatus as claimed in claim 6 including:
a lifting arm adapted to engage the lower surface of said pieces of deflected lumber and to exert a generally upward force thereon, said arm cooperative with said retractable member to facilitate deflection of said pieces of lumber to said standing position.

10. An apparatus for sorting pieces of lumber, comprising:
inclined chute means adapted for movement of pieces of lumber downwardly thereon in single file with the long axes thereof generally horizontal;
lumber accumulating tray means spaced apart from said chute means;
first deflector means associated with said chute means and adapted to selectively deflect pieces of lumber from said chute means to said tray means;
retractable means for engaging the leading edges of said pieces of deflected lumber and further deflecting said leading edges downwardly;
lift means cooperative with said retractable means for lifting the trailing edges of said pieces of deflected lumber to a generally vertical edge standing position in said tray means;
pusher means synchronized with said retractable means and adapted to push accumulated standing pieces of lumber forward in said tray means; and
resilient biasing means adapted to engage the forward side of a piece of said standing accumulated lumber for supporting at least a portion of said accumulated pieces in said standing position during said accumulation.

References Cited

UNITED STATES PATENTS

| | | | |
|---|---|---|---|
| 2,535,866 | 12/1950 | Rasmussen | 198—66 |
| 2,754,964 | 7/1956 | Muller | 209—123 |
| 3,268,096 | 8/1966 | Kitchener | 214—11 |
| 3,279,600 | 10/1966 | Lawson | 214—11 X |

ALLEN N. KNOWLES, *Primary Examiner.*